United States Patent
Ciechomski et al.

(10) Patent No.: US 8,559,786 B2
(45) Date of Patent: Oct. 15, 2013

(54) DEVICE FOR RECEIVING SUBASSEMBLIES ASSIGNED TO AT LEAST ONE OPTICAL FIBER CABLE AND FOR FASTENING THE SAME TO A MOUNTING

(75) Inventors: Tomasz A. Ciechomski, Lowicz (PL); Przemyslaw Karolak, Glakow Duzy (PL); Grzegorz K. Gralewski-Sek, Lodz (PL); Bartlomiej Sokolowski, Piolrkow Trybunalksi (PL)

(73) Assignee: CCS Technology, Inc., Wilmington, DE (US)

( * ) Notice: Subject to any disclaimer, the term of this patent is extended or adjusted under 35 U.S.C. 154(b) by 0 days.

(21) Appl. No.: 13/430,077

(22) Filed: Mar. 26, 2012

(65) Prior Publication Data
US 2012/0257866 A1 Oct. 11, 2012

Related U.S. Application Data

(63) Continuation of application No. PCT/US2010/049768, filed on Sep. 22, 2010.

(30) Foreign Application Priority Data

Sep. 28, 2009 (EP) ..................................... 09012260

(51) Int. Cl.
*G02B 6/00* (2006.01)
(52) U.S. Cl.
USPC ........................................................ 385/136
(58) Field of Classification Search
USPC ........................................................ 385/136
See application file for complete search history.

(56) References Cited

U.S. PATENT DOCUMENTS

| | | | |
|---|---|---|---|
| 4,066,317 A | 1/1978 | Bierenfeld et al. | 339/91 |
| 5,625,737 A | 4/1997 | Saito | 385/137 |
| 6,227,719 B1 | 5/2001 | Aoki et al. | 385/59 |
| 6,789,950 B1 * | 9/2004 | Loder et al. | 385/53 |
| 7,043,130 B2 * | 5/2006 | Ng et al. | 385/135 |
| 7,330,629 B2 | 2/2008 | Cooke et al. | 385/136 |
| 7,945,136 B2 * | 5/2011 | Cooke et al. | 385/135 |
| 8,218,936 B2 * | 7/2012 | Sek | 385/136 |
| 2005/0281526 A1 | 12/2005 | Vongseng et al. | 385/135 |
| 2007/0047897 A1 | 3/2007 | Cooke et al. | 385/136 |
| 2008/0019646 A1 | 1/2008 | DeJong | 385/99 |

FOREIGN PATENT DOCUMENTS

DE 9316137 A1 2/1994
WO WO02/16989 A1 2/2002

OTHER PUBLICATIONS

European Search Report; EP Application No. 09012260.7; Mail Date: Mar. 10, 2012.

* cited by examiner

*Primary Examiner* — Omar Rojas

(57) ABSTRACT

A device for receiving at least one subassembly, in particular at least one furcation plug or at least one furcation adaptor, assigned to at least one optical fiber cable and for fastening the or each subassembly received on the device to a mounting, in particular to a wall of a distribution panel or distribution cabinet, via the device, with a bar-shaped basic body, there being formed on a topside of the basic body a guide element for receiving the at least one subassembly, there being formed on an underside, in the region of mutually opposite ends of the basic body, anchoring elements, via which the device can be introduced into recesses of the mounting. The guide element can receive at least two subassemblies.

18 Claims, 3 Drawing Sheets

DEVICE FOR RECEIVING SUBASSEMBLIES ASSIGNED TO AT LEAST ONE OPTICAL FIBER CABLE AND FOR FASTENING THE SAME TO A MOUNTING

RELATED APPLICATIONS

This application is a continuation of International Application No. PCT/US10/49768 filed Sep. 22, 2010, which claims the benefit of priority to European Application No. 09012260.7 filed on Sep. 28, 2009, both applications being incorporated herein by reference.

FIELD

The present application relates to a device for receiving at least one subassembly, in particular at least one furcation plug or at least one furcation adaptor, assigned to at least one optical fiber cable and for fastening the or each subassembly received on the device to a mounting via the device.

BACKGROUND

FIG. 1 shows a device, known from the prior art, for receiving one subassembly, in particular one furcation plug or one furcation adaptor, assigned to one optical fiber cable and for fastening the subassembly received on the device to a mounting, particularly to a wall of a distribution panel or distribution cabinet via the device. The device 10, shown in a side view in FIG. 1, comprises a bar-shaped basic body 11 with a topside 12 and with an underside 13. On the topside 12 of the basic body 11 there is positioned a guide element being designed as guide rail 14, which extends approximately parallel to the bar-shaped basic body 11 and onto which, to receive the subassembly assigned to the optical fiber cable, the respective subassembly can be pushed in such a way that, when the subassembly is pushed onto the guide rail 14, the guide rail 14 engages into a groove formed on the subassembly to be received. The subassembly to be received on the device 10 is pushed onto the guide rail 14 in the direction of the arrow 15. The arrow 15 therefore indicates the direction in which a subassembly to be received by the device 10 and assigned to an optical fiber cable is pushed onto the guide rail 14.

In the region of the underside 13 of the bar-shaped basic body 11, anchoring elements 16 and 17 are formed in the region of mutually opposite ends of the basic body 11.

At the rear end of the basic body 11, as seen in the push-on direction 15, the anchoring element 16 is formed on the underside 13 of the basic body 11. At the front end of the basic body 11, as seen in the push-on direction 15, the anchoring element 17 is formed on the underside 13 of the basic body 11. Via the two anchoring elements 16, 17 the device 10 is able to be introduced into recesses of a mounting, to which the device 10, together with the subassembly received by it and assigned to the optical fiber cable, is to be fastened.

According to FIG. 1, the anchoring element 17 positioned at the front end, as seen in the push-on direction 15, of the bar-shaped basic body 11 is designed as an integral part of a stop 18 of U-shaped cross section, this stop 18 being effective in the push-on direction 15 and therefore, in the push-on direction 15, forming a stop for a subassembly to be pushed onto the guide rail 14.

The device 10 as illustrated in FIG. 1 is known from U.S. Pat. No. 7,330,629 B2.

Against this background, a novel device is provided allowing to increase the number of subassemblies which can be fastened to a mounting.

SUMMARY

Disclosed is a novel device for receiving at least one subassembly assigned to at least one optical fiber cable and for fastening the or each subassembly received on the device to a mounting via the device. A guide element of the device can receive at least two subassemblies in a stacked manner.

A novel fiber optic cable assembly using the device for receiving at least one subassembly assigned to at least one optical fiber cable is also disclosed. Further, a novel fiber optic shelf assembly comprising at least one fiber optic cable assembly is also disclosed herein.

Preferred embodiments of a device for receiving a subassembly assigned to an optical fiber cable and for fastening the subassembly received on the device to a mounting via the device are given in the dependent claims and the description below. Exemplary embodiments will be explained in more detail with reference to the drawings.

DETAILED DESCRIPTION

Figure 1:
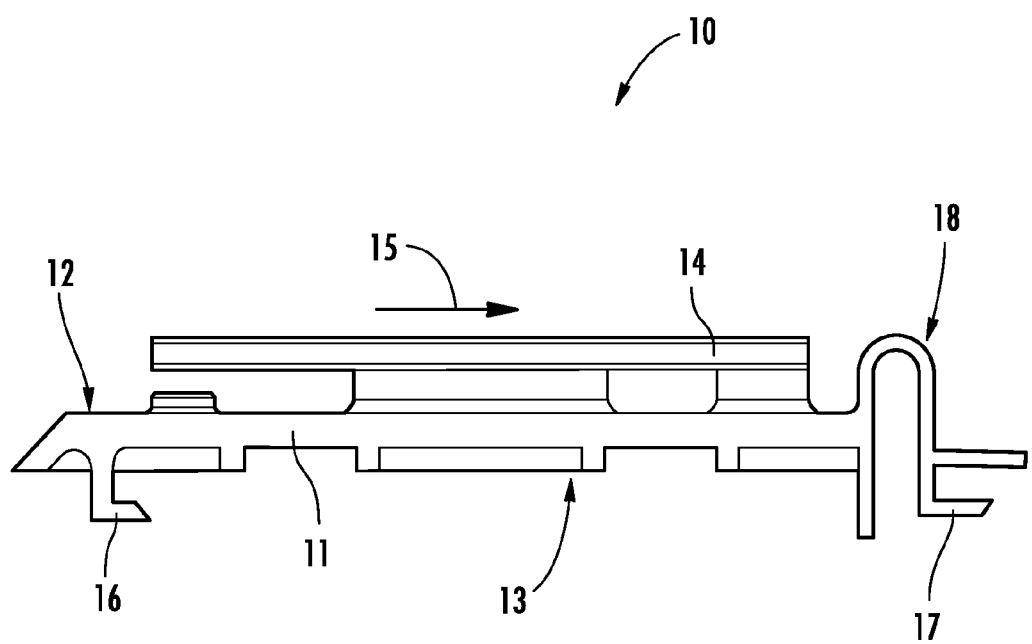
FIG. 1 shows a device, known from the prior art, for receiving a subassembly assigned to an optical fiber cable and for fastening the subassembly received on the device to a mounting, in a side view.
Figure 2:
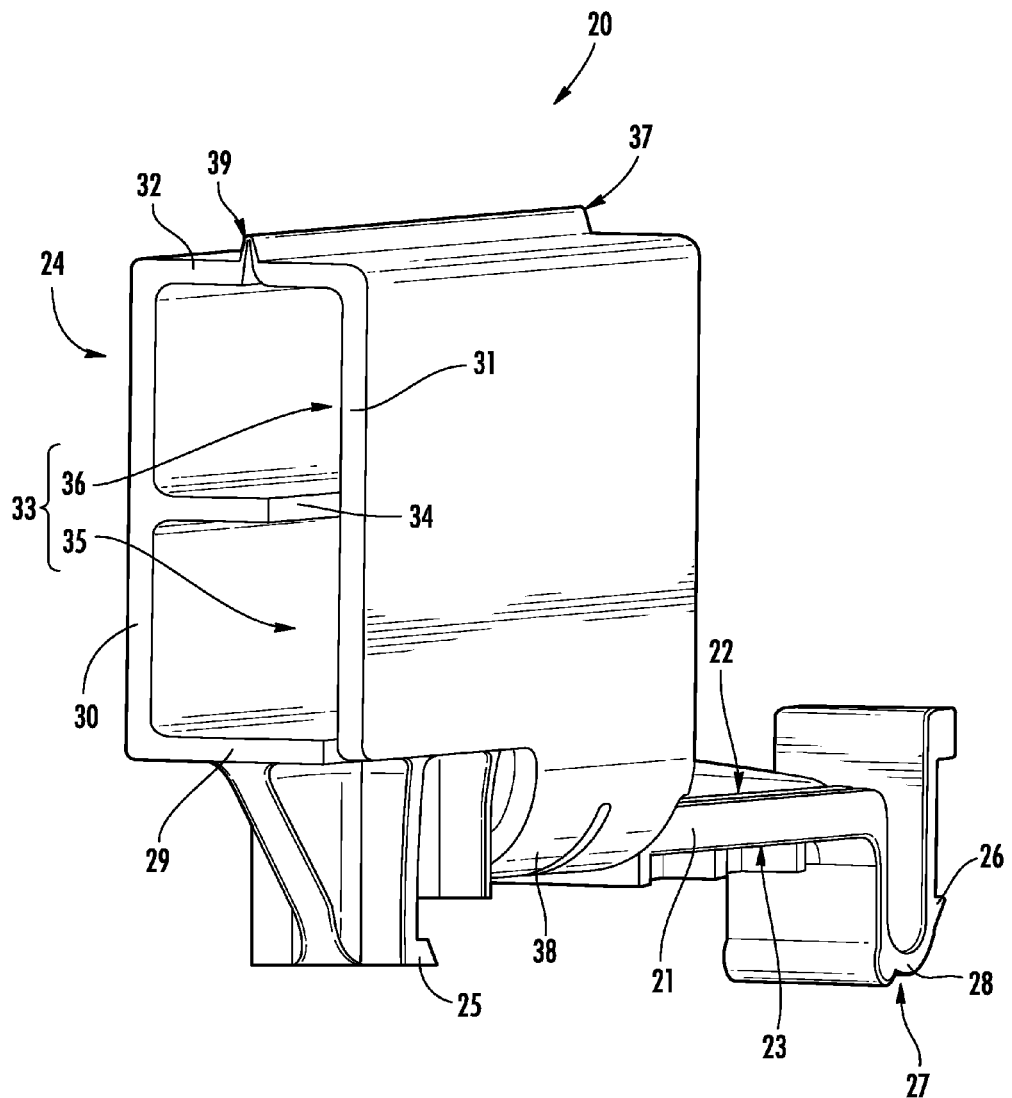
FIG. 2 shows a novel device for receiving subassemblies assigned to an optical fiber cable and for fastening the or each subassembly received on the device to a mounting, in a first perspective view.

FIG. 2 shows of a preferred embodiment of a device 20 according to the present invention for receiving at least one subassembly, such as, for example, at least one furcation plug or at least one furcation adaptor, assigned to at least one optical fiber cable and for fastening the or each subassembly received on the device 20 to a mounting, such as, for example, a mounting surface of a distribution panel or distribution cabinet or fiber optic shelf assembly, via the device.

The device 20 according to FIG. 2 has a bar-shaped basic body 21 with a topside 22 and with an underside 23. On the topside 23 of the bar-shaped basic body 21, a guide element 24 is formed which is designed to receive subassemblies, such as furcation plugs or furcation adaptors, assigned to at least one optical fiber cable.

At mutually opposite ends of the bar-shaped basic body 21, anchoring elements 25 and 26 are formed, via which the device 20 can be fastened to a mounting, in particular a wall of a distribution panel or distribution cabinet.

The device 20 can be fastened to a mounting in such a way that the anchoring elements 25, 26 can be introduced in a barb-like manner into recesses of the mountings and thus project into the recesses of the mounting. The anchoring element 26 positioned at the front end of the bar-shaped basic body 23 is formed as part of an element 27 having U-shaped cross section.

The element 27 being U-shaped is designed in such a way that a closed portion 28 of the latter is formed on the underside 23 of the bar-shaped basic body 21 or projects with respect to the underside 23 of the bar-shaped basic body 21. When the device 20 together with the or each subassembly received on the latter and assigned to the optical fiber cable, is to be fastened to a mounting, the element 27 being U-shaped engages with the closed portion 28 into a recess of the mounting.

When a force is exerted on the element 27 the element 27 is subjected to a deformation in a way that the bar-shaped body 21 ultimately arches and the anchoring elements 25, 26 of the latter are clamped in the region of the recesses of the mountings. There is then no risk that the anchoring elements 25, 26 jump out of the recesses of the mountings inadvertently and the device 20 comes loose from the mounting inadvertently.

The guide element 24 of the device 20 comprises a bottom wall 29 formed by said bar-shaped basic body 21, two opposite side walls 30, 31 and a top wall 32. Said walls 29, 30, 31 and 32 of the guide element 24 define an interior 33 of the guide element 24. The interior 33 is open at a front end and a rear end of said guide element 24.

The guide element 24, namely the interior 33 of the same, can receive at least two stacked subassemblies. The guide element 24 comprises at least one middle wall 34 running in parallel to said bottom wall 29 and said top wall 32 dividing said interior 33 into at least two subspaces 35, 36, whereby each subspace 35, 36 can receive one subassembly, especially one furcation plug or one furcation adaptor.

According to the shown embodiment, the interior 33 of the guide element 24 is divided by one middle wall 34 into two subspaces 35, 36, so that according to the shown embodiment two subassemblies can be positioned above each other in a stacked or stapled manner within the interior 33 of the guide element 24.

A hinge 37 is assigned to said top wall 32 of the guide element 24 so that a first side wall 31 of said two side walls 30 and 31 can be rotated around said hinge 37 with respect to a second side wall 30 of said two side walls 30 and 31 and with respect to said bottom wall 29 in order to open and close said guide element 24 for positioning a subassembly within the guide element 24 or for removing a subassembly from the same.

FIG. 2 shows the guide element 24 in closed position. By rotating the first side wall 31 around the hinge 27 the guide element 24 can be opened. When the guide element 24 is opened, the or each subassembly being positioned in the interior 33, namely in the subspaces 35 and 36 of the interior 33, can removed and replaced by another subassembly.

The bottom wall 29 of the guide element 24 is formed on the topside 22 of the basic body 21 as an integral part of the same. The second side wall 30 of the guide element 24 running perpendicular to said bottom wall 29 is non-rotatable with respect to said bottom wall 29.

The hinge 37 being assigned to said top wall 32 is positioned approximately in the middle of said top wall 32.

The hinge 37 divides the top wall 32 into two sections, namely a first section adjacent to the first side wall 31 and a second section adjacent to the second side wall 30, whereby the first section of the top wall 32 can be rotated together with the first side wall 31 around the hinge 37 with respect to a second side wall 30 and the second section of the top wall 32 in order to open and close said guide element 24.

A locking element 38 is assigned to the first side wall 31 of the guide element 24, namely to a lower end of said first side wall 31.

Said locking element 38 engages with said bar-shaped basic body 21 when said guide element 24 is closed. When the guide element 24 is closed the locking element 38 embraces the bar-shaped basic body 21 at the underside 23 of the same. When the device 20 to fastened to a mounting, there is no risk that the guide element 24 is opened because the locking element 38 has no place to open. This provides a security function for the locking element 38. When the device 20 to fastened to a mounting, the locking element 38 can not be opened.

Latches 39 are positioned as part of the hinge 37 above the same. The latches 39 serve as stop members limiting the rotation of the first side wall 31 around the hinge 37 with respect to the second side wall 30.

The basic function of the device 20 is to hold at least two subassemblies, such as at least two furcation plugs or at least two furcation adaptors, assigned to at least one optical fiber cable and the device 20 allows to place them without applying weaving forces into the or each optical fiber cable. The subassemblies being hold in the device 20 can be assigned to the same optical fiber cable or to individual optical fiber cables. The device 20 has a small and compact size, is easy to assemble and has a good durability at the same time. The device 20 can store a larger number of subassemblies, so that capacity on a mounting can be increased.

Figure 3:
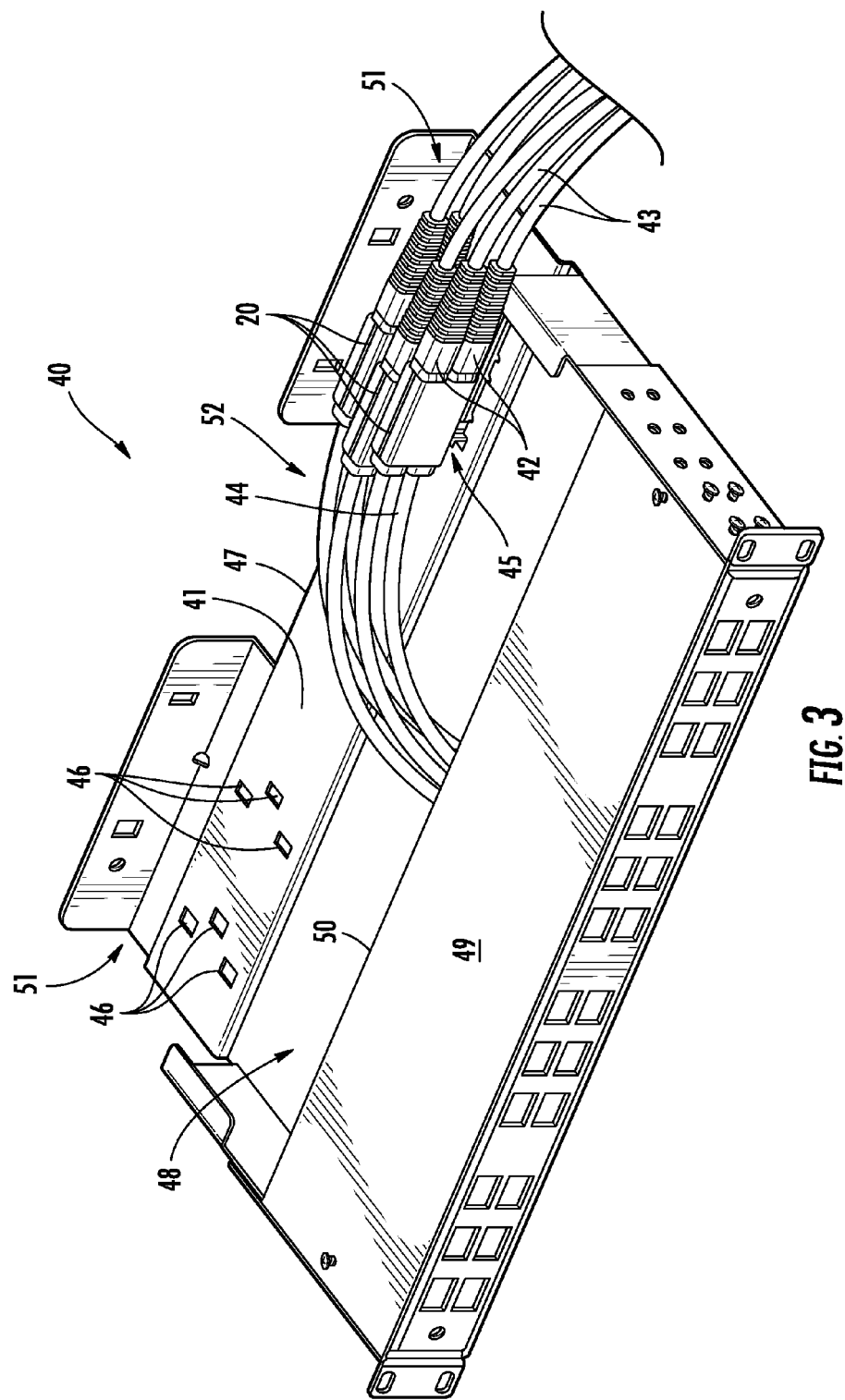
FIG. 3 shows a perspective view of an exemplary fiber optic shelf assembly together with devices according to FIG. 2, said devices according to FIG. 2 receiving subassemblies assigned to optical fiber cables and being mounted on a mounting surface of the fiber optic shelf assembly.

FIG. 3 illustrates a front perspective view of explanatory fiber optic equipment in the form of a fiber optic shelf assembly 40 serving as mounting for at least one device 20 according to FIG. 2.

According to FIG. 3, three devices 20 are mounted to a mounting surface 41 of the fiber optic shelf assembly 40, whereby each of said three shown devices 20 receives two subassemblies 42, in particular two furcation plugs, assigned to optical fiber cables 43.

Each of the devices 20 provides together with the two subassemblies 42 received by the respective device 20, together with the optical fiber cables 43 to which the subassemblies 42 are assigned and together with furcated legs 44 of the optical fiber cables 43 a fiber optic cable assemblies 45.

The furcated legs 44 may be of any shape, including but not limited to round or rectangular. The furcations of the optical fiber cables 43 may be performed by the cable manufacturer in a factory setting before mounting the fiber optic cable assembly 45 to the fiber optic shelf assembly 40.

The mounting surface 41 of the fiber optic shelf assembly 40 comprises a series of pre-defined recesses 46 that are configured to receive the anchoring elements 25 and 26 of the devices 20 for mounting the same to the mounting surface 41. As described above, the anchoring elements 25 and 26 of each device 20 can be introduced in said recesses 46 in a barb-like manner. The recesses 46 are formed in mounting surface 41 by any suitable manner such as stamped, predrilled, or the like.

As shown in FIG. 3, the fiber optic cable assemblies 45 comprising the devices 20, the subassemblies 42, the optical fiber cables 43 and the furcated legs 44 of the same are attached to a rear portion 47 of the fiber optic shelf assembly 40 in the form of a fiber optic tray 48.

In the example as shown, the fiber optic tray 48 has a 1 U size and supports a fiber optic adapter module 49. Although the fiber optic shelf assembly 40 is depicted as a 1-U any size or configuration is possible such as 4-U or vertical arrangement.

To establish fiber optic connections to the fiber optic adapter module 49, connections are made to one or more fiber optic adapters (not shown) disposed in a rear panel 50 of the fiber optic adapter module 49. In this regard, the optical fiber cables 43 are pulled and routed to the fiber optic tray 48. The fiber optic tray 48 contains openings 51 disposed on each side of the rear portion 47 of the fiber optic tray 48 and an opening 52 in the rear portion 47 to allow the optical fiber cables 43 to be routed into the rear portion 47 of the fiber optic tray 48.

The furcated legs 44 are typically connectorized with fiber optic connectors (not shown) for connecting with said fiber optic adapters (not shoen) in the rear panel 50 of the fiber optic adapter module 49, thereby establishing fiber optic connections.

The fiber optic cable assemblies 45 are secured by the devices 20 to the fiber optic shelf assembly 40; specifically, the fiber optic cable assemblies 45 are secured by the devices 20 to the fiber optic tray 48, and particularly to the rear portion 47. Securing the fiber optic cable assemblies 45 to the fiber optic tray 48 prevents or reduces the chance of bending or damage to the optical fiber cables 43 and the optical fibers therein due to forces applied to the fiber optic cable assemblies 45.

We claim:

1. A device for receiving at least one subassembly having at least one furcation plug or at least one furcation adaptor being a portion of at least one optical fiber cable assembly and for fastening the or each subassembly received on the device to a mounting via the device, the device comprising:
   a bar-shaped basic body;
   a guide element formed on a topside of the basic body for receiving the at least one subassembly, the guide element comprising:
      a bottom wall;
      a top wall;
      two opposite side walls, said bottom wall, said top wall and said opposite side walls defining an interior of said guide element for receiving at least two subassemblies, and said interior being open at a front end and a rear end of said guide element; and
      a hinge assigned to said top wall of said guide element so that a first side wall of said two opposite side walls can be rotated around said hinge with respect to a second side wall of said two side opposite walls and with respect to said bottom wall in order to open and close said guide element for positioning a subassembly within the guide element or for removing a subassembly from the same; and
   anchoring elements formed on an underside of the device, in the region of mutually opposite ends of the basic body via which the device can be introduced into recesses of the mounting.

2. The device of claim 1, wherein the guide element comprises at least one middle wall running in parallel to said bottom wall and said top wall dividing said interior into at least two subspaces, whereby each subspace can receive one subassembly.

3. The device of claim 1, wherein said hinge is positioned approximately in the middle of said top wall.

4. The device of claim 1, wherein latches are positioned as part of the hinge above the same, whereby the latches serve as stop members limiting the rotation of the first side wall around the hinge with respect to the second side wall.

5. The device of claim 1, wherein said first side wall which can be rotated around said hinge comprises at a lower end a locking element.

6. The device of claim 5, wherein said locking element embraces the bar-shaped basic body at the underside of the same when said guide element is closed.

7. The device of claim 1, wherein said bottom wall of the guide element is formed on the topside of the basic body as an integral part of the same, and that said second side wall of the guide element running perpendicular to said bottom wall is non-rotatable with respect to said bottom wall.

8. The device of claim 1, wherein at least one anchoring element of the anchoring elements is part of an end of the basic body, and is an integral part of a U-shaped element, whereby the U-shaped element is designed in such a way that a closed portion of the U-shaped element on the underside of the basic body projects with respect to the latter so that when the subassembly received by the device is fastened to the mounting, said closed portion can be introduced into a recess of the mounting.

9. A device for receiving at least two subassemblies of one or more optical fiber cable assemblies, the device comprising:
   a bar-shaped basic body; and
   a guide element formed on a topside of the basic body for receiving the at least two subassemblies, the guide element comprising:
      a bottom wall;
      a top wall;
      two opposite side walls, said bottom wall, said top wall and said opposite side walls defining an interior of said guide element for receiving said at least two subassemblies; and
      a hinge located at said top wall of the guide element so that a first side wall of said two opposite side walls is rotatable around said hinge with respect to a second side wall of said two side opposite walls and with respect to said bottom wall;
      wherein latches are positioned as part of the hinge above the same, whereby the latches serve as stop members limiting the rotation of the first side wall around the hinge with respect to the second side wall.

10. The device of claim 9, wherein the guide element comprises at least one middle wall running in parallel to said bottom wall and said top wall dividing said interior into at least two subspaces, whereby each subspace can receive one subassembly.

11. The device of claim 9, wherein said hinge is positioned approximately in the middle of said top wall.

12. The device of claim 9, wherein said first side wall comprises a locking element.

13. The device of claim 12, wherein said locking element embraces the bar-shaped basic body at the underside of the same when said guide element is closed.

14. The device of claim 9, wherein said bottom wall of the guide element is formed on the topside of the basic body as an integral part of the same, and that said second side wall of the guide element running perpendicular to said bottom wall is non-rotatable with respect to said bottom wall.

15. A fiber optic cable assembly comprising:
   a first fiber subassembly and a second fiber subassembly, each of the first and second fiber subassemblies comprising a furcation plug or a furcation adaptor;
   a device for receiving the first and second fiber subassemblies, the device comprising:
      a bar-shaped basic body; and
      a guide element formed on a topside of the basic body for receiving the first and second fiber subassemblies, the guide element comprising:
         a bottom wall;
         a top wall;
         two opposite side walls, said bottom wall, said top wall and said opposite side walls defining an interior of said guide element, wherein the first and second fiber subassemblies are disposed in said interior of said guide element in a stacked arrangement; and a hinge located at said top wall of the guide element so that a first side wall of said two opposite side walls is rotatable around said hinge with respect to a second side wall of said two side opposite walls and with respect to said bottom wall;

wherein latches are positioned as part of the hinge above the same, whereby the latches serve as stop members limiting the rotation of the first side wall around the hinge with respect to the second side wall.

16. The fiber optic cable assembly of claim 15, wherein the guide element comprises at least one middle wall running in parallel to said bottom wall and said top wall dividing said interior into a first subspace and a second subspace, whereby the first fiber subassembly is positioned in the first subspace and the second first subassembly is positioned in the second subspace.

17. The device of claim 15, wherein said hinge is positioned approximately in the middle of said top wall.

18. The fiber optic cable assembly of claim 15, wherein said first side wall comprises a locking element.

* * * * *